Figure 1:
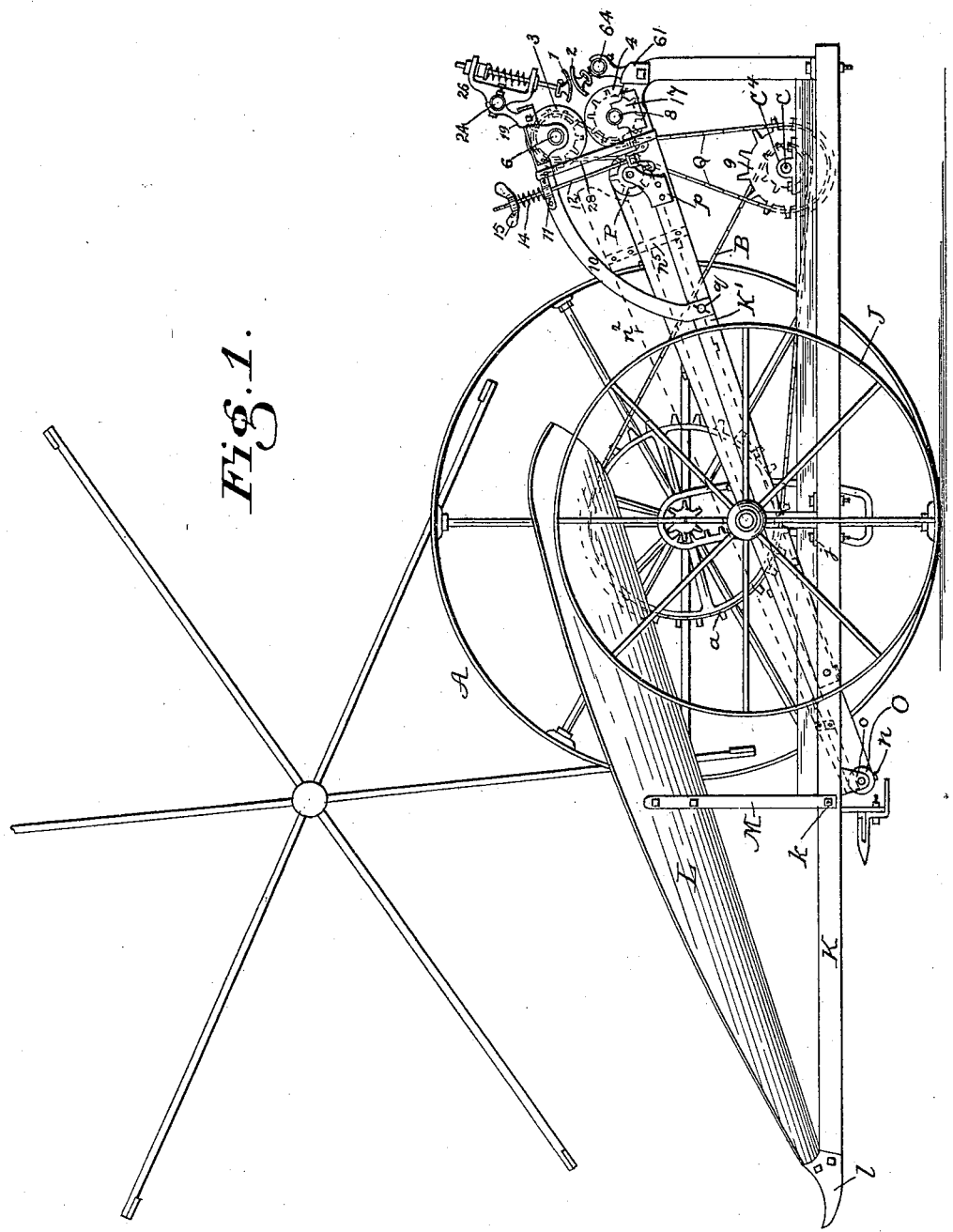

No. 616,786. Patented Dec. 27, 1898.
A. GUMP.
COMBINED HARVESTER AND THRESHER.
(Application filed Sept. 27, 1897.)
(No Model.) 6 Sheets—Sheet 1.

WITNESSES:
Jacob A. Davy.
A. F. Brownhall.

INVENTOR:
Alexander Gump
BY
Frank M. Burnham,
his ATTORNEY.

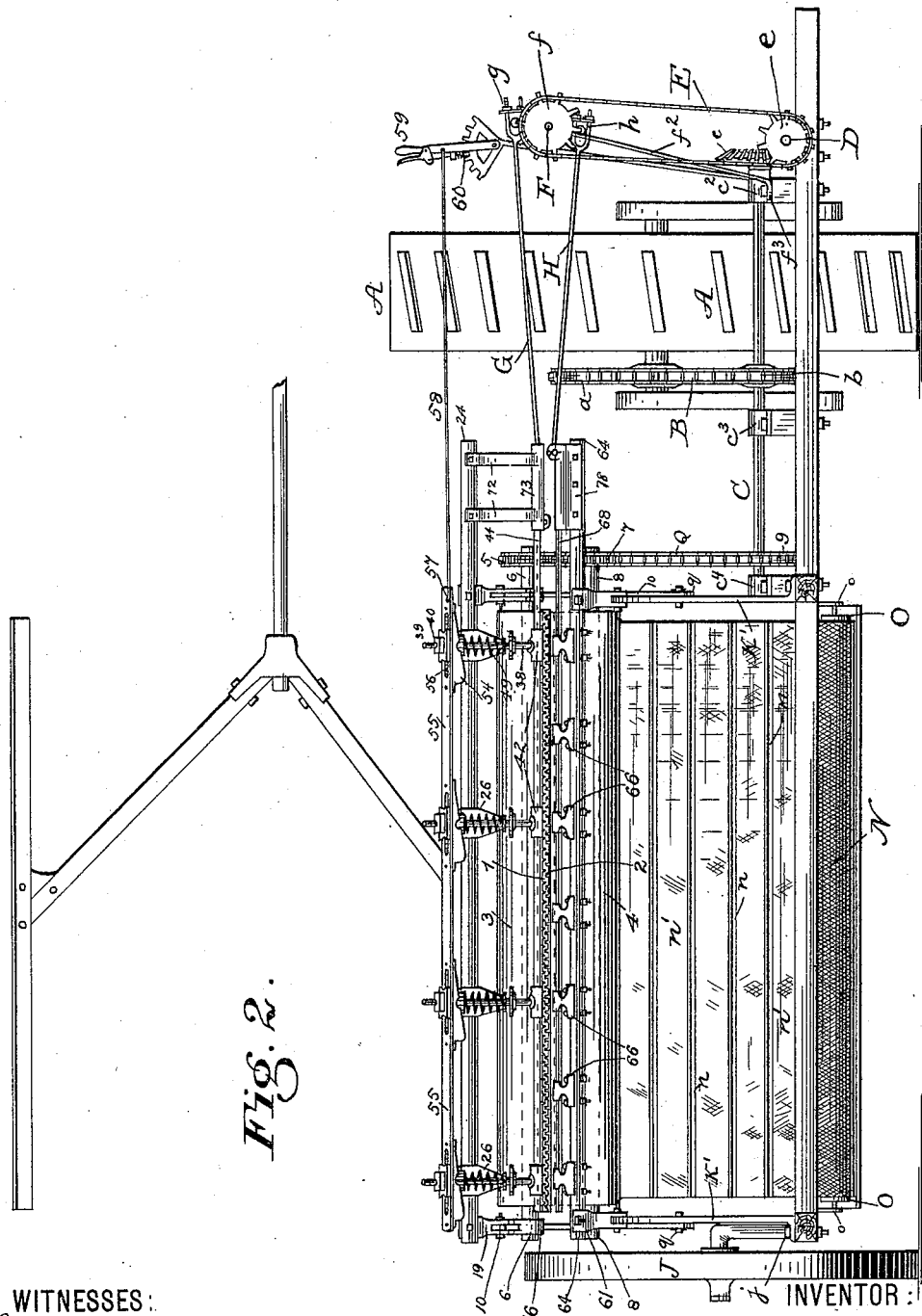

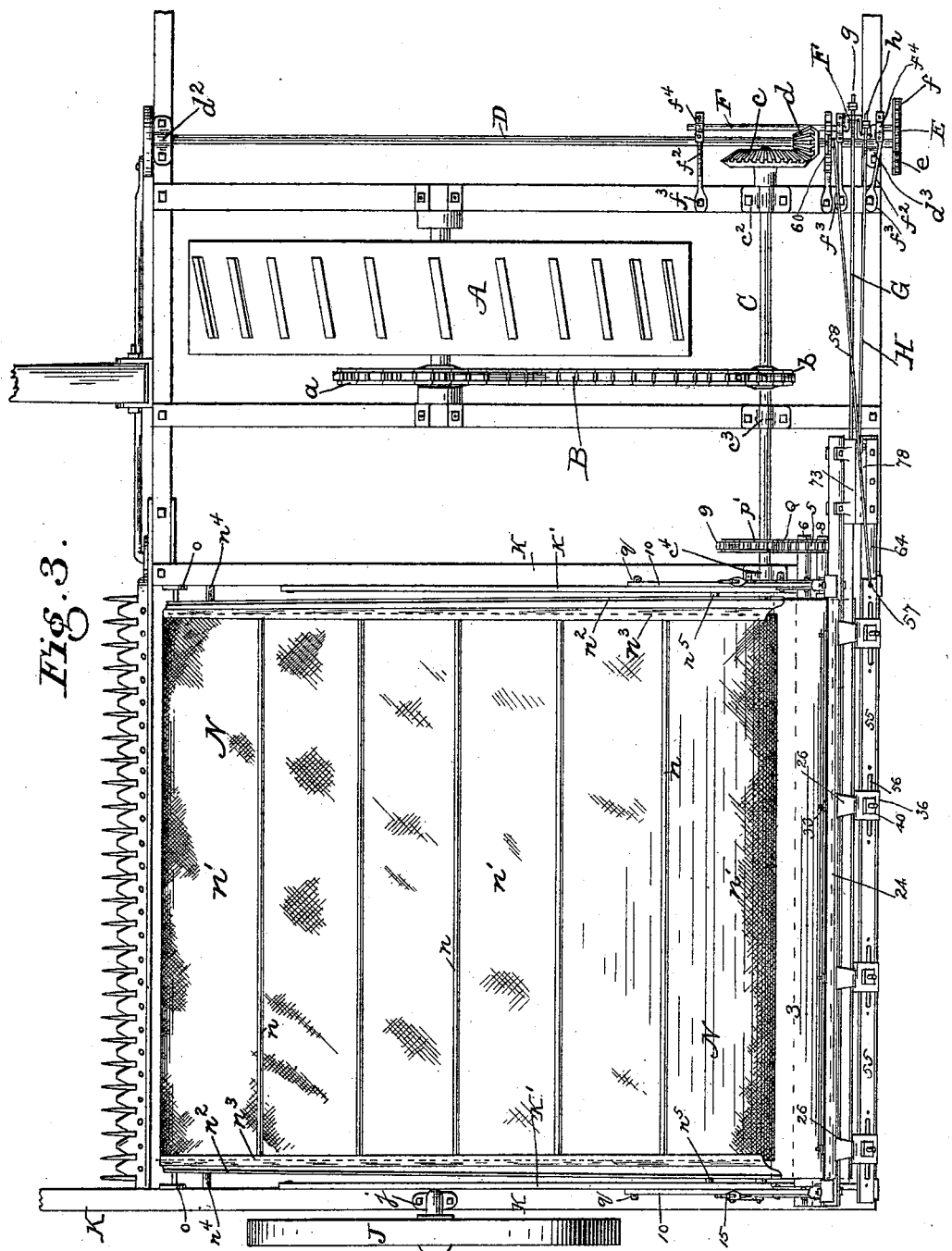

No. 616,786. Patented Dec. 27, 1898.
A. GUMP.
COMBINED HARVESTER AND THRESHER.
(Application filed Sept. 27, 1897.)
(No Model.) 6 Sheets—Sheet 4.
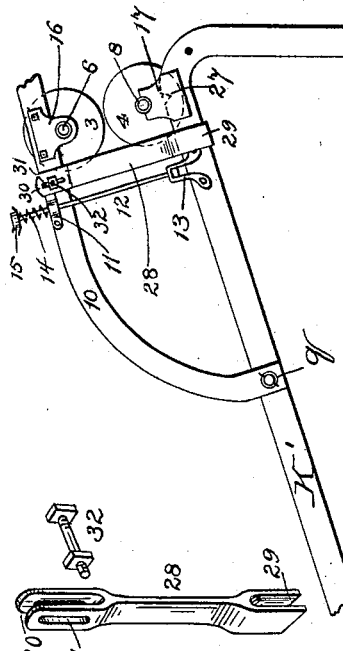
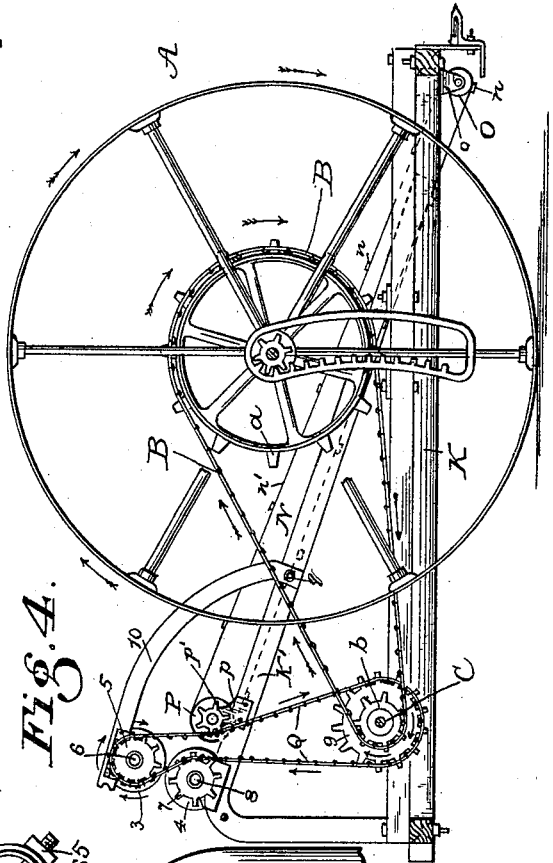
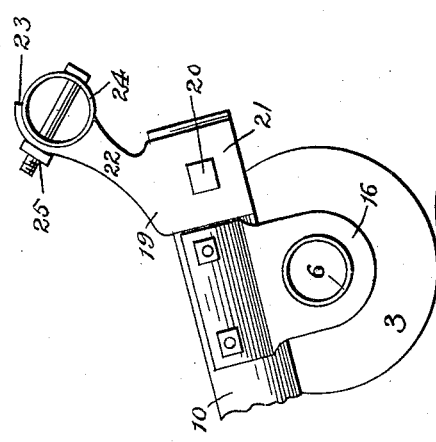
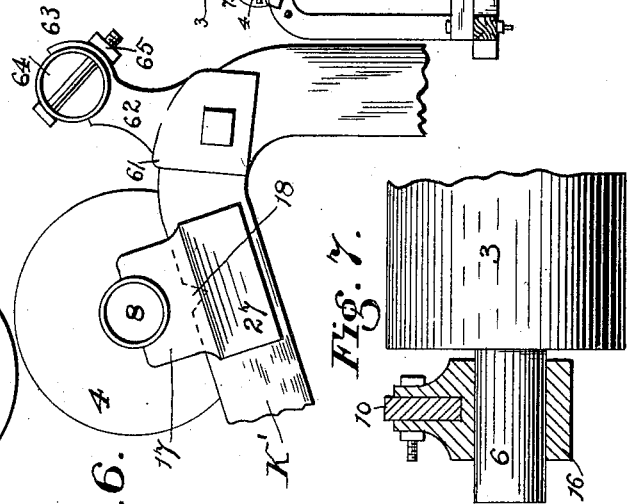
WITNESSES:
Jacob A. Davy.
A. F. Broomhall.
INVENTOR:
Alexander Gump.
BY
Frank M. Burnham,
his ATTORNEY.
THE NORRIS PETERS CO., PHOTO-LITHO., WASHINGTON, D. C.

No. 616,786. Patented Dec. 27, 1898.
A. GUMP.
COMBINED HARVESTER AND THRESHER.
(Application filed Sept. 27, 1897.)
(No Model.) 6 Sheets—Sheet 5.
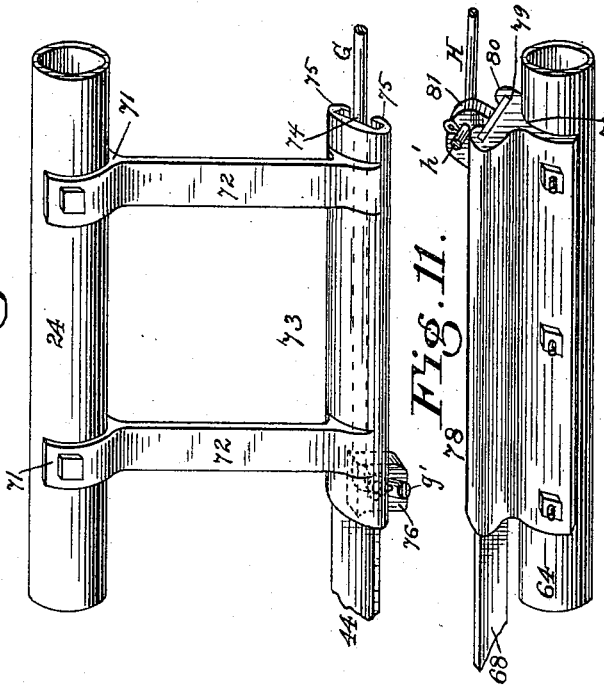
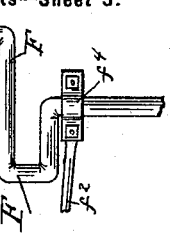
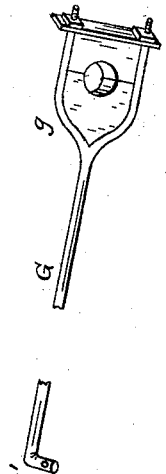
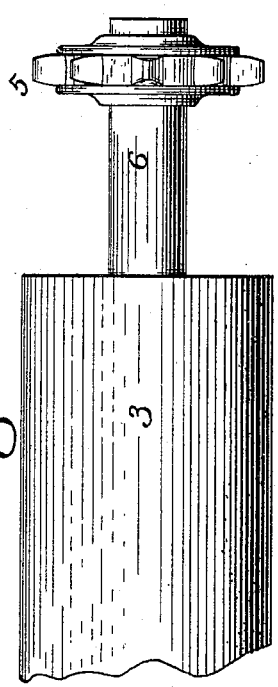
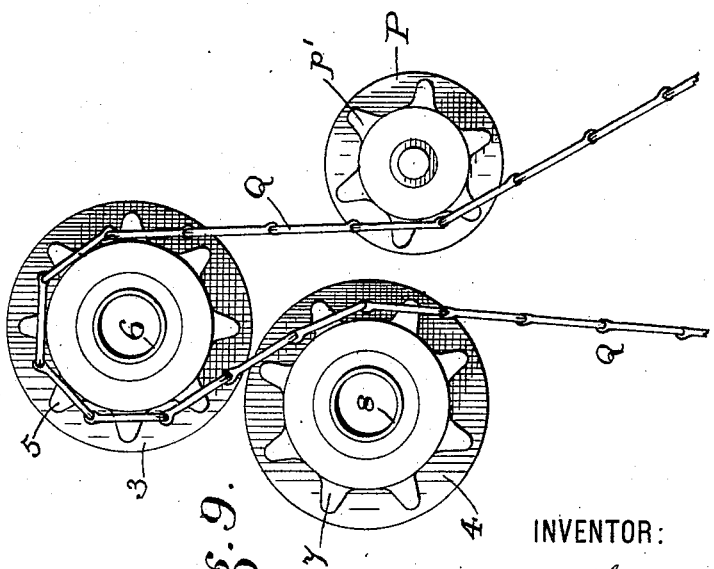
WITNESSES:
Jacob A. Davy.
A. F. Broomhall.
INVENTOR:
Alexander Gump
BY
Frank M. Burnham,
his ATTORNEY.
THE NORRIS PETERS CO., PHOTO-LITHO., WASHINGTON, D. C.

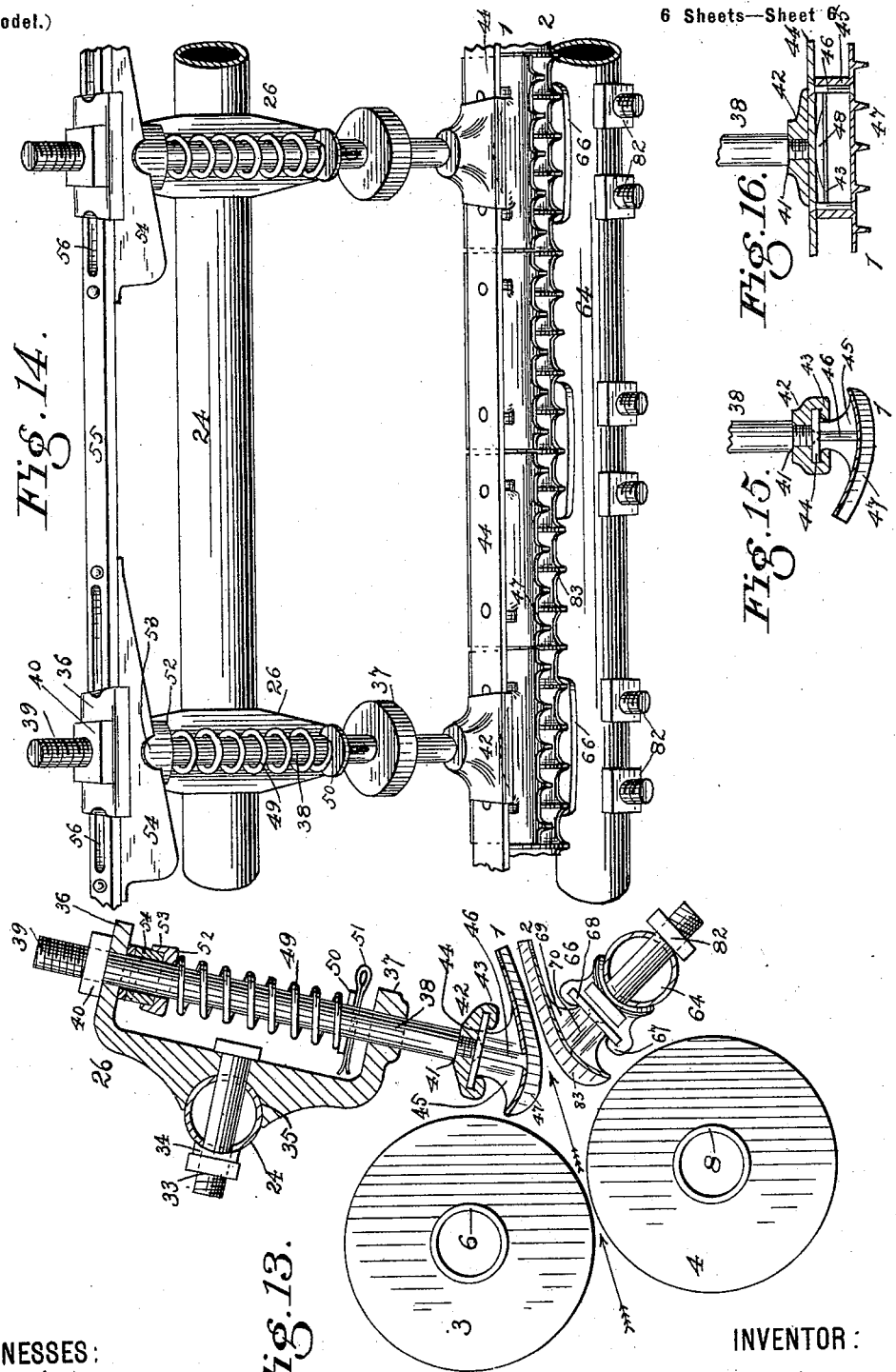

UNITED STATES PATENT OFFICE.

ALEXANDER GUMP, OF FLETCHER, OHIO, ASSIGNOR OF ONE-THIRD TO JOHN H. SAYERS AND WILLIAM R. SAYERS, OF SAME PLACE.

COMBINED HARVESTER AND THRESHER.

SPECIFICATION forming part of Letters Patent No. 616,786, dated December 27, 1898.

Application filed September 27, 1897. Serial No. 653,210. (No model.)

*To all whom it may concern:*

Be it known that I, ALEXANDER GUMP, a citizen of the United States, residing at Fletcher, in the county of Miami and State of Ohio, have invented certain new and useful Improvements in a Combined Harvester and Thresher; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.
My present invention relates to improvements in that class of agricultural machines commonly known as "combined harvesters and threshers;" and it consists in combining with the parts of an ordinary and common form of harvester by placing on the transporting-frame thereof elastic rollers, reciprocating threshing-bars, and other improved features of novel construction, as will be hereinafter fully described, and pointed out in the claims.

The main object of my present invention is to obviate the objectionable form of large heavy cumbersome machines now in use and commonly known as "headers," which are very expensive and designed more especially for very large farms of hundreds of acres; and to this end I so construct my combined harvester and thresher of such a simple form and so few parts as to be so light that it can be readily transported and operated by two or three horses and manufactured at comparatively small cost.

My combined harvester and thresher is designed to cut the grain at any height and to be used in harvesting and threshing any and all kinds of grain—such as wheat, oats, barley, millet, and flax—while in the field when left standing until fully ripe, thus of course doing away with the complicated and expensive binders.

Referring to the accompanying drawings, illustrating my invention, and in which similar letters and numerals of reference indicate like parts in the several views, Figure 1 is a side elevation of a combined harvester and thresher embodying my invention. Figs. 2 and 3 are respectively end and plan views of the same. Fig. 4 is a side elevation from the master-wheel side, illustrating enough of the machine to show sprocket-wheels and chain for operating the elastic rollers and driving-roller of grain elevator or conveyer. Fig. 5 includes views in detail of rear portion of side frame having mounted thereon the curved arm and mechanism for regulating the tension of the elastic rollers. Fig. 6 includes enlarged views in detail of a portion of one of the curved and upright side arms which support upper and lower elastic rollers, showing their relative position, and upper and lower brackets supporting the upper and lower tubular shafts which carry the threshing-bars. Fig. 7 is an enlarged detail view of a portion of the upper elastic roller, showing its bracket in section. Fig. 8 is an enlarged side view in detail of a portion of one of the rollers and sprocket-wheel for operating same. Fig. 9 is an enlarged end view in detail of the two elastic rollers, the upper or driving roller of the conveyer, and the sprocket at the end of each of the said rollers and a portion of the chain by which they are operated. Fig. 10 is an enlarged perspective view in detail of upper threshing-bar guide attached to upper tubular shaft and showing end of flat draw-bar of upper threshing-bar and portion of pitman-rod and connection in position. Fig. 11 is an enlarged perspective view in detail of lower threshing-bar guide as attached to lower tubular shaft, showing end of flat draw-bar of lower threshing-bar and a portion of pitman-rod and connection in position. Fig. 12 includes enlarged detail views of one of the pitmen which operate the threshing-bar and double-crank shaft to which said pitman is connected. Fig. 13 is an enlarged transverse sectional view of upper and lower threshing-bar brackets carrying upper and lower threshing-bars and attached to upper and lower tubular shafts, respectively; also, the elastic rollers in end elevation in their relative positions, with course of grain indicated by arrows. Fig. 14 is an enlarged perspective view in detail of a section of upper and lower threshing-bars and other parts as shown in

Fig. 13, with the omission of the rollers. Figs. 15 and 16 are enlarged transverse and longitudinal sectional views, respectively, of a portion of the upper threshing-bar.

It will be obvious that as the machine is put in motion by means of the driver (whose seat may be located on any suitable portion of the machine) starting the horses the master-wheel A as it revolves on its axle will turn the driving-sprocket $a$, which by means of its sprocket-chain B will in turn revolve the small sprocket $b$, and thus by turning its axle or main shaft C (which is supported on the frame by means of bearings $c^2$, $c^3$, and $c^4$, and to which it is journaled), cause bevel gear-wheel $c$ to mesh with small pinion $d$, thereby revolving shaft D, on which said pinion is located. Said shaft D is supported at its forward and rear ends by transporting-frame in bearings $d^2$ and $d^3$, and by means of its connection with pitman-rod and wheel at its forward end will operate the sickle and knives at the front of the machine, and thus cut the grain in the ordinary and well-known manner, while at rear end of said shaft D is rigidly attached sprocket-wheel $e$, over which passes chain E, transmitting power to a similar sprocket $f$ some distance above it, and as said sprocket $f$ is thus caused to revolve it carries with it the short double-crank shaft F, which extends horizontally (same as the tubular shafts and all other shafts) and is supported by upright rods or standards $f^2$, each having a foot bolted to frame at $f^3$ and formed at their tops with a bearing $f^4$, in which crank-shaft F is journaled, and connected to said double-crank shaft are pitmen $g$ and $h$, the rods G and H (see Figs. 2 and 12) of which are connected to the flat draw-bars of threshing-bars 1 and 2, respectively, by which means a reciprocating motion is imparted to them as the double-crank shaft is revolved by its sprocket $f$, as above described, and the cut grain as received from between the upper and lower elastic rollers, with the bolls cracked, is thoroughly threshed by a "cross motion" at right angles to the travel of the straw, which is of such a vibrating or oscillating character as to separate the grain from the straw by abrasion or rubbing instead of tearing the grain from the straw, as is the case of ordinary threshers constructed with a cylinder, and is especially applicable in the case of flax, which is thoroughly threshed, the same as all other grains, as described, by passing between the rollers, while by the old style the cylinders fail to crack all the bolls. Said grain as it falls below by the law of gravitation is cleaned and sacked by an improved mechanism, which I have not here shown, as it is no part of my present invention. The straw as it is separated from the grain, as just described, is intended to fall from the rear of the machine into the field; but in case said straw should be needed it can be carried from the rear of the machine at right angles thereto over to the stubble or master-wheel side and deposited in the field, so as to be out of the way of the horses on the return trip, by means of a "carrier" of any well-known form.

The grain-wheel J, located on opposite side of machine, has a suitably-bent axle attached at $j$ to the side sill K of an ordinary transporting-frame, at the end of which is attached the grain-divider $l$ (which divides the standing from the cut grain) and from which arises outside grain-board L, which is supported by a flat upright brace or standard M, which is bolted at its top ends thereto, said brace in turn being supported by side sill K, to which it is attached at $k$, and as an ordinary form of reel operated in the well-known manner forces the grain (which is only intended to be cut when perfectly ripe, as heretofore stated) against the knife-edges of the sickle the grain as cut will fall on the endless canvas apron or belt $n'$ of grain elevator or conveyer N, said endless apron or belt being provided with small narrow transverse slats or cleats $n$, so as to facilitate the conveying or elevating of the grain as cut to the upper and lower elastic rollers 3 and 4. It will be here observed that instead of the grain-elevator being located and run at right angles to the travel of the grain when cut, as heretofore, my grain elevator or conveyer N is so arranged as to run in a direct line with the travel of the grain back to the rear of the machine, thus preventing the accumulation and piling up of the grain on the cutter-bar and impeding the operation and effective cutting of the sickle, as heretofore, and permitting of a thin even cut to be carried to the rollers. Located on each side and extending the entire length of said grain elevator or conveyer N are inside grain boards or guides $n^2$, having small wings $n^3$ projecting therefrom (see Fig. 3) over endless apron $n'$ of elevator for the purpose of guiding or confining the grain in its course to the elastic rollers, said inside grain-boards being attached at their lower or forward ends to the side sill K by small braces $n^4$ and at their upper or rear ends are supported and connected to side arms K' of frame by upright braces $n^5$. (See Fig. 3 and dotted lines, Fig. 1.)

The lower or forward end of grain-elevator N is formed with a small roller O, located a short distance from the cutter-bar and journaled at each end in small bearings $o$, attached to grain and master-wheel side of frame K and are about the length of cutter-bar, and around said roller O passes endless canvas apron $n'$.

P is the upper elevator-roller, which is journaled in small brackets or bearings $p$, attached to side arms K' of transporting-frame K. The end nearest master-wheel carries on its shaft a small sprocket $p'$, which is operated by means of a sprocket-chain Q, which passes around its rear side and engages teeth of said sprocket, as shown in Figs. 4 and 9 and partially in dotted lines, Fig. 1, and thus operates said canvas apron $n'$, which conveys or elevates the grain as cut to the elastic rollers 3 and 4, the tension of said elastic rollers being sufficient, and said upper and lower rollers 3 and 4 being formed of any suitable elastic material, preferably rubber, and the grain being fully ripe its bolls are cracked but not crushed, and said elastic rollers revolve by means of chain Q passing around sprocket 5, located on tubular shaft 6 of said upper roller, and thence down between and engage the teeth of sprocket $p'$ of upper or drive roller P, of elevator N, and teeth of sprocket 7 on tubular shaft 8 of said lower elastic roller 4, thence down and around sprocket 9 on shaft C, and from which it receives its power as said shaft is revolved, as first above described.

Located at the rear end and mounted on each side of the main portion of the machine and pivotally hinged at $q$ are the curved arms 10, each provided with a small bracket 11, through which passes upright rod or standard 12, the lower end of said rod or standard terminating in a bead, which is held in position by a bracket 13, attached to side arm K' of frame, while upper end of upright rod or standard 12 is encircled by a coil-spring 14 and is screw-threaded to receive thumb-nut 15, which when operated forces said spring down upon curved arm 10, and attached thereto and depending therefrom is a bracket 16, having loosely journaled therein tubular shaft 6, said shaft having mounted thereon upper elastic roller 3, through which it passes and forms a part thereof, and thus regulates the tension of the rollers upon the bolls of the grain and also to grip the straws as the grain is passed between said upper and lower elastic rollers 3 and 4 to the corrugated reciprocating threshing-bars 1 and 2 just in their rear. Mounted at the end of each of the curved arms 10 (see Figs. 1 and 6) is a bracket 19, secured thereto by bolt 20, which passes through the bifurcated ends 21 and curved arm 10. The upright arm 22 of said bracket 19 has its top 23 concaved as of a semicircular form to receive the transverse tubular shaft 24, which it supports and through which passes a bolt and nut 25 to hold said shaft in position. (See Fig. 6.) Said shaft 24 carries and has mounted thereon at suitable distance apart (see Figs. 2 and 14) a number of brackets 26 for supporting the upper threshing-bar 1, as will be more fully described in detail hereinafter. Said transverse tubular shaft 24 has also mounted at its inner end, at master-wheel side, upper threshing-bar guide 73, as will be more fully described in detail hereinafter. It will be readily seen that to facilitate the disengaging of any of these parts the curved arms 10 may be thrown over forward by means of their pivotal construction at $q$.

Lower elastic roller 4 is supported by means of its tubular shaft or core 8, having its bearing on both grain and master-wheel sides in brackets 17, formed with bifurcated ends 27 and a downwardly-extending V-shaped flange or rib 18, (see dotted lines, Fig. 6,) firmly resting in a V-shaped groove in top of arm K' of frame.

An upright brace or supporting-arm 28 (see Fig. 5) has its lower bifurcated end 29 resting over arm K', while its upper bifurcated end 30, which supports curved arms 10, is formed with slot 31, which receives the clamping-bolt 32, said bolt passing through curved arm 10 and by means of nut and screw-thread at each end holds curved arm 10 in its proper position to help regulate the tension, thus preventing the upper elastic roller 3 from dropping upon lower elastic roller 4 and crushing the grain and becoming inoperative. Said brace or supporting-arm 28 is located between rod or standard 12 and the elastic rollers 3 and 4.

Transverse tubular shaft 24 is supported at each end in a bracket 19, as heretofore described, and at suitable distance are brackets 26, (see Figs. 1, 2, 13, and 14,) each bracket being firmly secured to said transverse tubular shaft 24 by bolt and nut 33 and washer 34, said washer having one face smooth to bear against nut and other concaved to fit shaft 24. Brackets 26 have a semicircular concavity 35, in which the said transverse tubular shaft 24 is seated, and passing upward and in a slightly-backward direction through the upper and lower flanged lips or extensions 36 and 37 of bracket 26 is the rod or flange 38, having its top end 39 screw-threaded to receive a nut 40.

The lower end of each rod or plunger 38 is screw-threaded and formed with a shoulder at 41, by which it is secured to a foot 42, formed with lips or flanges 43, so as to support the flat draw-bar 44 of upper reciprocating threshing-bar 1, to which it is connected by short upright arms 45 and rivets 46. Said upper threshing-bar 1 has a corrugated bottom or face 47, (which materially differs from the lower threshing-bar in one respect—viz., in being formed in sections,) by which the grain is threshed as it passes between it and similar corrugations and face of lower threshing-bar 2 when a reciprocating motion is imparted. The lips or flanges 43 of said upper reciprocating threshing-bar have formed on their inside a convexed portion 48, (see Fig. 16,) which bears up against flat draw-bar 44, said draw-bar being of sufficient temper and flexibility, and the corrugated bottom or face of said threshing-bar being formed in sections, as shown in Fig. 14, allows of sufficient expansion or vibration so as to conform to the amount of grain which may pass through. It will be readily seen that the upper threshing-bar and its brackets 26 are set at an incline, so as to avoid the elastic rollers.

Between the upper and lower flanged lips 36 and 37 of each of the brackets 26 and encircling the plunger-rod 38 is located the coil-spring 49, held in position by a washer 50 and small pin or cotter 51. At the top of said spring is located a collar 52, formed with two upturned flanges or lips 53, and passing between said lips 53 is the wedge-shaped extension 54 of a draw-bar 55, formed with longitudinal slots 56. Through said slots passes upright rod 38. The top of draw-bar 55 bears up against horizontal flange or lip 36 of the bracket, while its wedge-shaped extension 54 bears down against the collar 52 and between the lips 53 thereof. Connected to the end of said draw or sliding bar 55 at 57 is a rod 58, the opposite end of which is connected to a small hand-lever 59, provided with a spring-pawl and ratchet 60, mounted upon any suitable standard connected to the transporting-frame, and by operating said hand-lever 59 the draw-bar 55, by means of the wedge-shaped extensions 54, will help to regulate the tension of the upper threshing-bar upon the grain, as described.

At rear upper end of side arms K' are rigidly secured brackets 61, the upright arms 62 of which have their tops 63 formed in a semicircular concavity to receive the lower transverse tubular shaft 64, which they support and through which passes a bolt with nut 65 to hold said tubular shaft in position, similar to upper brackets 19. (See Fig. 6.) Said transverse tubular shaft 64 has also mounted near its inner end at master-wheel side lower threshing-bar guide 78, as will be more fully described in detail hereinafter. Securely mounted on lower transverse tubular shaft 64 by means of bolts and nuts 82 and extending upward at a slight forward incline from said tubular shaft are a number of short brackets 66 so arranged as to place every other one on a vertical parallel line with a bracket 26 just above it, while every other one is located as to a vertical line about midway between said brackets 26. The flanged lips 67, formed at the top of each of said brackets 66, act as a guide for flat draw-bar 68, to which is attached, by means of vertical flanges or standards 69 and pins 70, lower transverse reciprocating threshing-bar 2, the corrugated face 83 of which extends up toward corrugated face 47 of upper threshing-bar 1, so that as a reciprocating motion is imparted to it, said threshing bar 2 by means of its flat draw-bar 68 slides backward and forward through flanged lips 67, and thus threshes the grain by abrasion as it passes through the upper and lower threshing-bars from the elastic rollers 3 and 4.

Attached to transverse tubular shaft 24, near its inner end, by means of bolts and nuts passing through the bifurcated tops 71 of two vertical or upright arms 72, is the guide 73 of upper threshing-bar 1, the inner end of flat draw-bar 44 of said upper threshing-bar being guided in its reciprocating movement in the slotted opening 74, formed by lips 75 in guide 73, by reason of pitman-rod G having its hooked end g', which is formed with an eye therein, passing through an extension or lug 76, formed on bottom of inner end of said draw-bar 44 and held therein by a small pin or cotter passing through the eye in said hooked end g' and by which means power is imparted thereto through the medium of the pitman-rod G of pitman g and crank-shaft F from master-wheel A, as fully described heretofore.

Attached to transverse tubular shaft 64, near its inner end, (located just below above-described upper guide,) by means of bolts passing through the concaved flanged bottom 77 thereof, is the guide 78 for lower threshing-bar 2, the inner end of the flat draw-bar 68 of said lower threshing-bar being guided in its reciprocal movement in the slotted opening 79, formed by lips 80 in guide 78, by reason of pitman-rod H having its hooked end h' formed with an eye therein and passing through eye or opening in the upward extension or lug 81, formed on the top of flat draw-bar 68 and held therein by a small pin or cotter passing through the eye in said hooked end h' (the same as in upper draw-bar 44) and by which means power is imparted thereto through the medium of pitman-rod H of pitman h and crank-shaft F from master-wheel A, as fully described heretofore.

I do not limit myself to any exact form of construction of the elastic rollers, threshing-bars, or any other improved features so long as the principles of my invention are maintained.

Having now described my invention, what I claim as new and useful, and desire to secure by Letters Patent, is—

1. In a combined harvester and thresher, the combination with the transporting-frame thereof; of the grain-rollers constructed of suitable elastic material mounted on tubular shafts; suitable bearings mounted on side arms projected from the transporting-frame, said side arms having pivotally hinged thereto curved arms and having disposed between said side and curved arms a brace having bifurcated ends, and a tension-rod provided with a spring and thumb-nut for regulating the tension, all substantially as and for the purposes specified.

2. In a combined harvester and thresher, the combination with the herein-described conveyer or elevator comprising an endless band provided with rollers at each end and means for supporting and revolving said rollers, one roller being located in close proximity to the sickle and the other located in close proximity to the elastic grain-rollers; of the elastic rollers mounted on shafts; bearings for said shafts mounted on side arms, said side arms supporting curved arms and having disposed between said side and curved arms a brace formed with bifurcated ends, and a tension-rod carrying a spring and thumb-nut for regulating the tension of said elastic rollers, substantially as specified.

3. In a combined harvester and thresher, the combination of the upper reciprocating threshing-bar 1, a portion of the same being formed with a corrugated surface 47 made up in sections and connected to a tempered flat draw-bar 44 on which is located the lug 76; the brackets 26 having upper and lower flanged lips 36 and 37 through which passes the rod or plunger 38, said rod or plunger provided with a foot 42 formed with lips 43 and a convexed portion 48, said rod or plunger being further provided with a washer 50 and pin 51, a spring 49, a collar 52 having ears 53 in which rests the slotted extension 54 of the upper draw-bar 55, a nut on the screw-threaded end of said rod or plunger 38 for retaining said extension 54; the slotted guide 73 depending by its arms from shaft 24; said slotted guide provided with lips 75 through which said draw-bar 44 reciprocates; all substantially as and for the purposes specified.

4. In a combined harvester and thresher, the combination of the lower reciprocating threshing-bar 2 provided with a bar or portion formed with a corrugated surface 83 made in one entire piece and connected to a flat draw-bar 68, on which is located the lug 81; the short brackets 66 formed with lips 67 and connected by bolts and nuts to a shaft 64; the slotted guide 78 having a concaved portion 77 by which it is connected to said shaft 64, said slotted guide provided with lips 80 through which said draw-bar 68 reciprocates, all substantially as and for the purposes specified.

5. In a combined harvester and thresher the combination with the elastic rollers, each roller formed over a tubular shaft, each of said shafts provided with a sprocket and journaled in suitable bearings and provided with suitable mechanism as described for regulating the tension of said rollers; of an upper reciprocating threshing-bar provided with a bar or portion formed with a corrugated surface made in sections and connected to a flat draw-bar; the upper set of brackets formed with flanged lips through which passes a rod or plunger, said rod or plunger provided with a foot formed with lips and a convexed portion; a collar formed with ears in which rests the slotted extension of the upper draw-bar; a nut on screw-threaded end of said rod or plunger for retaining said extension; the slotted guide depending by its arms from the upper shaft, said slotted guide provided with lips through which reciprocates the lower draw-bar of said upper threshing-bar; a lower reciprocating threshing-bar provided with a bar or portion formed with a corrugated surface and connected to a draw-bar, of a lower set of brackets formed with lips and connected to a shaft; and a slotted guide having a concaved portion by which it is connected to said shaft and provided with lips through which said draw-bar reciprocates; all substantially as and for the purposes specified.

6. In a combined harvester and thresher the combination with a conveyer or elevator comprising an endless band provided with transverse cleats, having a forward roller in close proximity to the sickle and adapted to revolve in suitable bearings, and a rear roller provided with means as described for supporting and revolving the same; said endless band to pass around its rollers and in direction with travel of the grain as cut, of the suitably-supported inside grain-boards on each side of said conveyer formed with wings extending far enough over endless apron to confine the course of the grain; of the elastic rollers mounted over tubular shafts, said shafts provided with means as described for supporting same; of tubular shafts having bracket-supports as described at each end; the upper shaft having attached thereto a number of brackets provided with a rod or plunger, a washer and pin, a spring, a collar formed with ears or lugs; of a flat draw-bar formed with a slotted extension through which passes screw-threaded top of rod having a nut thereon, said draw-bar operated by means of rod connected at its end as described, said rod or plunger having a foot with lips; of a reciprocating threshing-bar having a corrugated portion made up of sections, and a flat draw-bar adapted to move through the lips of said foot, a lug on said flat draw-bar to which is connected a pitman-rod for transmitting power; of a guide whose upright arms are bifurcated at top and connected to upper shaft, its slotted bottom formed with lips through which plays flat draw-bar; of a lower tubular shaft having a number of brackets connected thereto formed with lips through which passes the flat draw-bar of lower reciprocating threshing-bar, a lug on said flat draw-bar to which is connected a pitman-rod for transmitting power; of a guide connected by its concaved flanged bottom to the lower tubular shaft and having its slotted top formed with lips through which plays said flat bar, said lower reciprocating threshing-bar also formed with a corrugating portion in one entire piece all for the purpose of threshing the grain from the straw, substantially in the manner and for the purposes set forth and described.

7. In a combined harvester and thresher the combination with the transporting-frame thereof; of side arms K' mounted thereon and having a bracket 61 securely connected to it formed with an upright arm 62 having a concave top 63, to which is suitably journaled the shaft carrying the lower reciprocating threshing-bar; a bracket 17 having a V-shaped rib 18 resting in a correspondingly V-shaped groove in top of said arms, and in which is journaled the shaft carrying the lower elastic roller; a bracket or bearing P in which is journaled the shaft carrying the upper roller of the conveyer or elevator; the upright brace or standard 28 having the lower bifurcated end 29, a small bracket 13; a curved arm 10 hinged to said side arms K', and carrying a bracket 19 formed with an upright arm 22 having a concaved top 23 in which is journaled the tubular shaft carrying the upper reciprocating threshing-bar; a bracket 16 in which is journaled the shaft carrying the upper elastic roller; the upper bifurcated end 30 of said upright brace 28 resting over said curved arms and adjustably connected thereto by means of a slot, bolt and nuts; a tension-rod 12 and a bracket or loop 11 through which passes upper end of said tension-rod 12 provided with a spring 14 and thumb-nut 15; all substantially as and for the purposes specified.

8. In a combined harvester and thresher the combination with the master-wheel thereof, of the driving-sprocket $a$ journaled on the axle of said master-wheel, the endless chain B connecting and transmitting power to the small sprocket $b$, the main shaft C, the beveled gear-wheel $c$, the pinion $d$, and shaft D, the sprocket $e$ at end of said shaft D carrying a chain E by which power is transmitted to sprocket $f$; the said sprocket being adapted to operate the pitmen $g$ and $h$, pitman, rods G and H, the sprocket 9 on opposite end of said main shaft C, the sprocket-chain Q, said chain also engaging sprocket 7 on shaft of lower elastic roller, sprocket 5, and a suitably-supported ratchet provided with a pawl, hand-lever and connecting-rod for operating the upper draw-bar of upper threshing-bar for the purpose of regulating the tension of the threshing-bars.

9. The combination in a combined harvester and thresher, of the suitably-supported main shaft C, the sprocket 9 and chain Q transmitting power to sprockets on shafts of the drive-roller of the conveyer and upper and lower elastic grain-rollers respectively; the small sprocket-wheel $b$, chain B, and driving-sprocket $a$ by which said main shaft is operated, the beveled gear-wheel $c$, pinion $d$, shaft D, for operating the sickle and knife, the sprocket-wheel $e$, chain E, sprocket-wheel $f$, and crank-shaft F, the pitmen $g$ and $h$ formed with boxes journaled to said double-crank shaft, the pitman-rods G and H connecting with the draw-bars of the upper and lower reciprocating threshing-bars, the ratchet and pawl 60, hand-lever 59 and connecting-rod 58 for operating the upper flat draw-bar of upper reciprocating threshing-bar by which the tension of the threshing-bars is regulated; all substantially as and for the purposes specified.

In testimony whereof I affix my signature in presence of two witnesses.

ALEXANDER GUMP.

Witnesses:
C. F. GROSVENOR,
M. F. GROSVENOR.